H. H. DREYER.
COMBINED GAGE WHEEL AND COLTER.
APPLICATION FILED MAR. 8, 1909.
922,405.
Patented May 18, 1909.
2 SHEETS—SHEET 1.
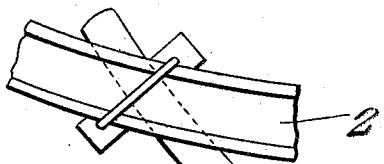
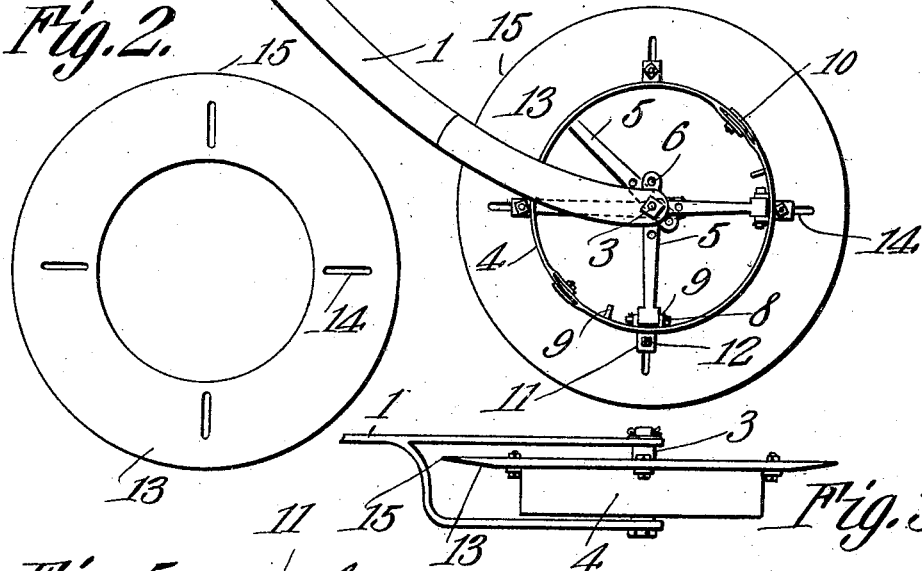
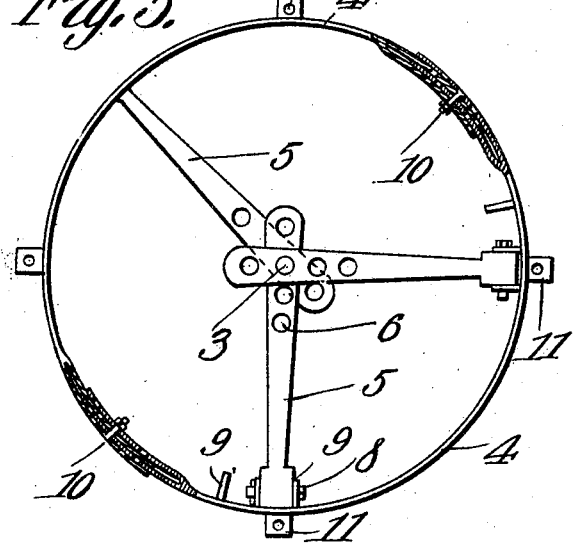
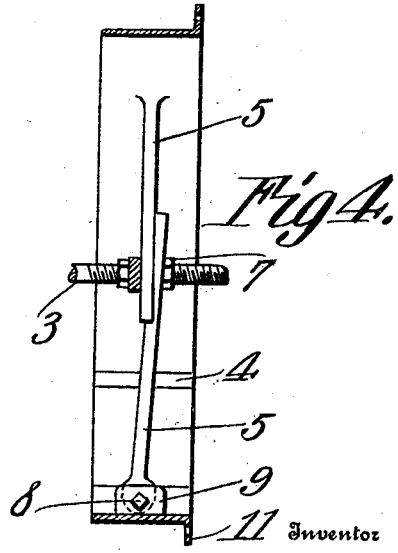
Witnesses
Inventor
Harry H. Dreyer.
By C. A. Snow & Co.
Attorneys

H. H. DREYER.
COMBINED GAGE WHEEL AND COLTER.
APPLICATION FILED MAR. 8, 1909.

922,405.

Patented May 18, 1909.
2 SHEETS—SHEET 2.

Witnesses

Inventor
Harry H. Dreyer.
By C. A. Snow & Co.
Attorneys

UNITED STATES PATENT OFFICE.

HARRY H. DREYER, OF GLENDIVE, MONTANA.

COMBINED GAGE-WHEEL AND COLTER.

No. 922,405.  Specification of Letters Patent.  Patented May 18, 1909.

Application filed March 8, 1909. Serial No. 482,066.

*To all whom it may concern:*

Be it known that I, HARRY H. DREYER, a citizen of the United States, residing at Glendive, in the county of Dawson and State of Montana, have invented a new and useful Combined Gage-Wheel and Colter, of which the following is a specification.

This invention has relation to combined gage wheels and colters for plows, and it consists in the novel construction and arrangement of its parts as hereinafter shown and described.

The object of the invention is to provide a combined attachment as indicated, in which the gage wheel portion may be increased or diminished in diameter, as desired, to cause the plow to make a relatively deep or shallow cut.

A further object of the invention is to provide an attachment as indicated which is of simple construction and which is effective in its operation both as a gage wheel and a colter.

Figure 6:
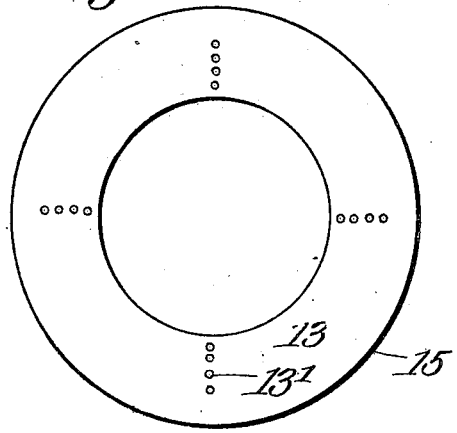
Figure 7:
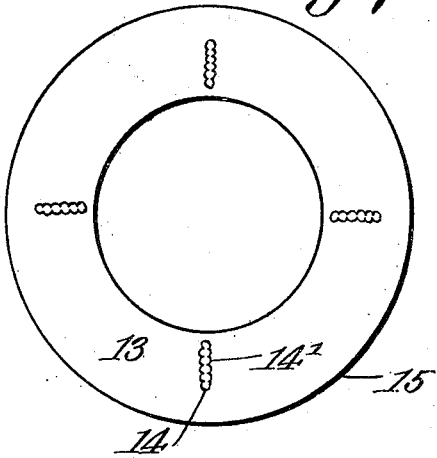
Figure 8:
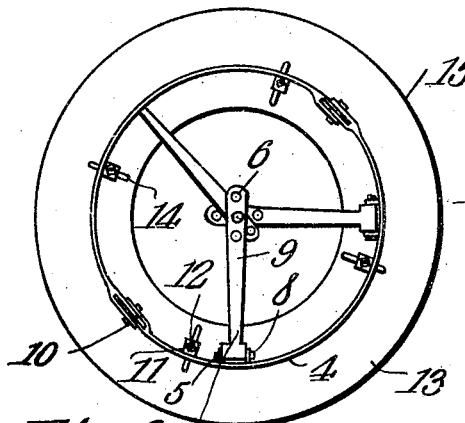
Figure 9:
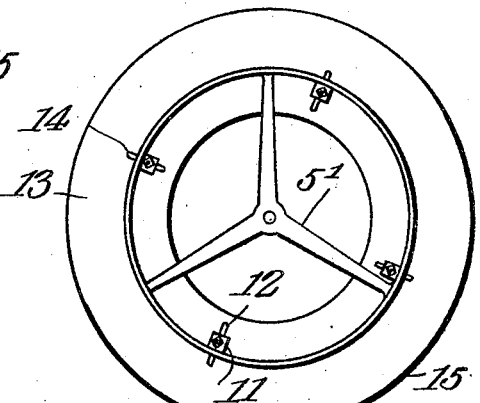
Figure 10:
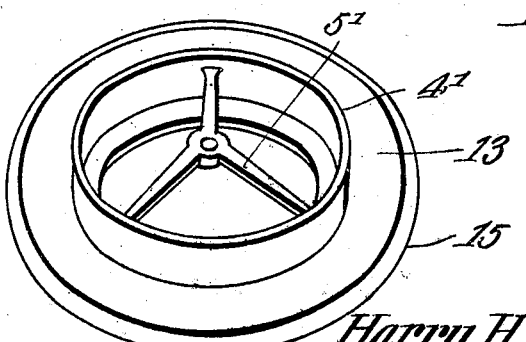

In the accompanying drawings:—Figure 1 is a side elevation of the attachment. Fig. 2 is a side elevation of the colter disk detached. Fig. 3 is a top plan view of the attachment. Fig. 4 is a vertical sectional view of the gage wheel portion of the attachment. Fig. 5 is a side elevation of the gage wheel portion of the attachment with parts in section. Fig. 6 is a side elevation of a modified form of the colter. Fig. 7 is a side elevation of another modified form of the colter. Fig. 8 is a side elevation of a modified form of the gage wheel and the colter. Fig. 9 is a side elevation of another modified form of the gage wheel and colter. Fig. 10 is a perspective view of still another modified form of the gage wheel and colter.

The combined attachment consists of an arm 1, which is adapted to be clamped or otherwise secured in the usual manner to the beam 2 of a breaking plow. The said arm 1 is provided with the bifurcated end 2, which carries the axle 3. The gage wheel portion of the attachment is made up of a series of segmental sections 4, each of which is provided with one or more spokes 5. Each spoke 5 is provided at its inner end portion with a series of perforations 6, which are adapted to receive the axle 3, and which are held in position thereon by means of the clamping nut 7. The spokes 5 may be rigidly connected with the sector sections 4, or they may be connected with the same by means of the bolts 8 which pass transversely through perforations provided at the latter ends of the spokes and also through the lugs 9, attached to the inner sides of the segmental sections 4. The ends of the adjacent segmental sections 4 which go to make up the gage wheel portion of the attachment slidably engage each other and may be provided with securing devices, as bolts and nuts 10, which pass through registering perforations in the overlapping ends of the said segmental sections. Securing devices of other designs may be used instead of the said bolts and nuts 10 when desired. The gage wheel portion of the attachment may be made up of two or more segmental sections 4, as the number of the said sections is immaterial. Each section 4 of the said gage wheel portion of the attachment is provided with one or more laterally disposed lugs 11, which are perforated to receive the bolts 12.

The colter disk or ring 13 is provided with an open center, and is also provided with the radially disposed slots 14, which are adapted to receive the bolts 12 located in the lugs 11. The ring or disk 13 is provided with a sharp peripheral edge 15, which is adapted to cleave the soil.

From the foregoing description it is obvious that, by removing the securing devices 10, and also by loosening or removing the nuts 7 from the axle 3, that the inner ends of the spokes 5 may be overlapped to a greater or less extent, and when properly adjusted, registering perforations 6 at the inner end portions of the said spokes may be caused to receive the axle 3, and then the securing devices 10 may be passed through registering perforations in the end portions of the adjacent gage wheel segmental sections. Thus the diameter of the said gage wheel as an entirety may be increased or diminished, whereby the plow to which the attachment is applied may be caused to operate at a desired depth in the soil. When the diameter of the gage wheel has been adjusted as above described, the nuts 12 are passed through the lugs 11 and also through the slots 14 in the colter disk or ring 13, and thus the said disk or ring is mounted upon the gage wheel portion of the attachment, and may perform its functions as a sod-cutter at the time that the gage wheel is in operation, and controlling the depth at which the plow will operate in the soil.

In the form of colter as shown in Fig. 6 of the drawings the elongated slots 14 as shown in Fig. 2 are dispensed with and in lieu thereof several series of perforations 13' are provided. In the form of colter as shown in Fig. 7 the edges of the slots 14 are provided with the serrations 14' which are adapted to engage the securing bolt 12 whereby the gage wheel is attached to the said colter.

In the form of the combined gage wheel and colter as shown in Fig. 8 of the drawings, the lugs 11 are inwardly disposed instead of being outwardly disposed as shown in Fig. 5 of the drawings.

In the form of the invention as illustrated in Fig. 9 of the drawings, the gage wheel 4' consists of a single section and is mounted upon the spider 5' which takes the place of the spokes 5 as illustrated in the preceding figures of the drawing. In this figure of the drawing, the lugs 11 are inwardly disposed the same as shown in Fig. 8 of the drawings. The advantage of having the said lugs inwardly disposed is that they are protected by the gage wheel and cannot accumulate trash or dirt.

In the form of the invention as illustrated in Fig. 10 of the drawings, the gage wheel 4' is integral with the colter 13 and the spider 5' is integral with the said gage wheel 4'. In this form of the invention no provision is made whereby the gage wheel may be adjusted with relation to the colter and when it is desired to cause the plow to operate in the soil at a different depth, the combined gage wheel and colter as shown in Fig. 10 is removed and a gage wheel of different diameter with a colter attached substituted.

Having described my invention, what I claim as new, and desire to secure, by Letters Patent, is:—

1. A combined gage wheel and colter comprising a colter disk and a gage wheel portion attached thereto, and means for increasing and decreasing the diameter of the gage wheel portion.

2. A combined gage wheel and colter comprising a colter disk having an open center, a gage wheel portion attached to the disk and surrounding the opening in the center thereof, and means for increasing and decreasing the diameter of the gage wheel portion.

3. A combined gage wheel and colter comprising a colter disk having an open center and being provided with radially disposed slots, a gage wheel portion having laterally disposed lugs, securing devices passing through the lugs and adapted to enter the slots of the colter portion, and means for increasing and decreasing the diameter of the gage wheel portion.

4. A combined gage wheel and colter comprising a colter disk having an open center and being provided with radially disposed slots, a series of segmental sections comprising a gage wheel and having overlapping end portions, securing devices passing through the said overlapping end portions of the sections of the gage wheel, spokes carried by the sections of the gage wheel and having at their inner ends a series of perforations, an axle passing through registering perforations of all of the spokes, and securing devices mounted upon the axle for clamping the inner ends of the spokes together.

In testimony that I claim the foregoing as my own, I have hereto affixed my signature in the presence of two witnesses.

HARRY H. DREYER.

Witnesses:
W. E. Drake,
A. S. Fass.